(12) United States Patent
McKee et al.

(10) Patent No.: US 11,888,606 B2
(45) Date of Patent: Jan. 30, 2024

(54) MONITORING OF DISTRIBUTED SYSTEMS

(71) Applicant: BRITISH TELECOMMUNICATIONS PUBLIC LIMITED COMPANY, London (GB)

(72) Inventors: Paul McKee, London (GB); Nicholas Davies, London (GB); Sandra Stinčić-Clarke, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 217 days.

(21) Appl. No.: 16/966,535

(22) PCT Filed: Dec. 28, 2018

(86) PCT No.: PCT/EP2018/097100
§ 371 (c)(1),
(2) Date: Jul. 31, 2020

(87) PCT Pub. No.: WO2019/149439
PCT Pub. Date: Aug. 8, 2019

(65) Prior Publication Data
US 2021/0051199 A1    Feb. 18, 2021

(30) Foreign Application Priority Data
Feb. 2, 2018   (EP) .................... 18154987

(51) Int. Cl.
*H04L 67/12*      (2022.01)
*H04W 4/38*       (2018.01)
(Continued)

(52) U.S. Cl.
CPC .......... *H04L 67/12* (2013.01); *H04L 41/22* (2013.01); *H04L 41/5009* (2013.01); *H04L 67/61* (2022.05); *H04W 4/38* (2018.02)

(58) Field of Classification Search
None
See application file for complete search history.

(56) References Cited

U.S. PATENT DOCUMENTS

| | | | |
|---|---|---|---|
| 5,786,993 | A | 7/1998 | Frutiger et al. |
| 7,194,645 | B2 | 3/2007 | Bieswanger et al. |
| | | (Continued) | |

FOREIGN PATENT DOCUMENTS

| | | |
|---|---|---|
| CN | 1768518 | 5/2006 |
| CN | 102055531 | 5/2011 |
| | (Continued) | |

OTHER PUBLICATIONS

International Search Report for PCT/EP2018/097100 dated Feb. 12, 2019, 3 pages.
(Continued)

*Primary Examiner* — Kevin T Bates
*Assistant Examiner* — Emad Siddiqi
(74) *Attorney, Agent, or Firm* — Nixon & Vanderhye P.C.

(57) ABSTRACT

An environment of sensors and actuators is operated in accordance with predetermined policies, and the effectiveness of individual policies is monitored by comparing inputs from the sensors (550) with intended outcomes from policies controlled by previous inputs from one or more of the same sensors. Each policy includes a check function (554), wherein a sensor, other than the one that triggers the actions, monitors the actions generated by the policy and generates an output (556) indicative of whether a system state is approaching a condition specified by the policy.

12 Claims, 5 Drawing Sheets

(51) Int. Cl.
*H04L 41/22* (2022.01)
*H04L 41/5009* (2022.01)
*H04L 67/61* (2022.01)

(56) References Cited

U.S. PATENT DOCUMENTS

| | | |
|---|---|---|
| 7,324,907 B2 | 1/2008 | Joublin et al. |
| 7,617,304 B2 | 11/2009 | Devarakonda et al. |
| 7,788,362 B2 | 8/2010 | Chess et al. |
| 8,504,874 B2 | 8/2013 | Goldszmidt et al. |
| 8,826,369 B2 | 9/2014 | Uchida |
| 9,274,512 B1 | 3/2016 | Zima |
| 9,714,771 B1 | 7/2017 | Goodman et al. |
| 2004/0193912 A1 | 9/2004 | Li et al. |
| 2009/0138888 A1 | 5/2009 | Shah et al. |
| 2012/0253746 A1 | 10/2012 | Kolar |
| 2012/0323615 A1 | 12/2012 | Johnson et al. |
| 2013/0226320 A1 | 8/2013 | Berg-Sonne et al. |
| 2013/0310986 A1 | 11/2013 | Gust et al. |
| 2014/0015745 A1 | 1/2014 | Chae et al. |
| 2015/0134801 A1* | 5/2015 | Walley .................. H04L 43/50 709/223 |
| 2015/0142139 A1 | 5/2015 | Manssen et al. |
| 2015/0217449 A1 | 8/2015 | Meier et al. |
| 2015/0286969 A1 | 10/2015 | Warner et al. |
| 2015/0337806 A1 | 11/2015 | Damgaard et al. |
| 2015/0350254 A1 | 12/2015 | Hendrick et al. |
| 2016/0291552 A1 | 10/2016 | Biplab et al. |

FOREIGN PATENT DOCUMENTS

| | | |
|---|---|---|
| CN | 104159250 | 11/2014 |
| CN | 106871389 | 6/2017 |
| CN | 107014037 | 8/2017 |
| EP | 2 469 479 A1 | 6/2012 |
| EP | 2896899 | 7/2015 |
| GB | 2479817 A | 10/2011 |
| GB | 2558902 | 7/2018 |
| KR | 10-2014-0015745 | 2/2014 |
| WO | 2008/136737 | 11/2008 |
| WO | 2009/079036 | 6/2009 |
| WO | 2015/042899 A1 | 4/2015 |
| WO | 2015/092395 | 6/2015 |
| WO | 2015/092395 A1 | 6/2015 |
| WO | 2016/119816 A1 | 8/2016 |
| WO | 2018/133992 | 7/2018 |

OTHER PUBLICATIONS

Written Opinion of the ISA for PCT/EP2018/097100 dated Feb. 12, 2019, 6 pages.
Combined Search and Examination Report for GB1801749.1 dated Jul. 18, 2018, 10 pages.
Extended European Search Report for EP18154987.4 dated Jul. 2, 2018, 9 pages.
Extended European Search Report for EP18191853.3 dated Dec. 17, 2018, 7 pages.
Li et al., "Policy-Based Secure and Trustworthy Sensing for Internet of Things in Smart Cities", IEEE Internet of Things Journal, vol. 5, No. 2, Jun. 27, 2017, pp. 716-723.
Resilient Network Systems, "Handling Real-Time Sensor Data: Data Tagging and Governance", Mar. 2015, 4 pages.
Westerinen et al., "Terminology for Policy-Based Management", Network Working Group, Nov. 2001, 21 pages.
Ribler et al., "The Autopilot performance-directed adaptive control system", FGCS, 18, 2001, pp. 175-187.
Qwasmi et al., "TinyPolicy: A Distributed Policy Based Management Framework for Wireless Sensor Networks", IEEE Explore, downloaded Jul. 15, 2020, pp. 918-921.
GB Search Report for GB1814131.7 dated Jan. 11, 2019, 2 pages.
Communication pursuant to Article 94(3) EPC dated May 26, 2021 issued in European Application No. 18 830 879.5 (7 page).
Search Report dated Jun. 9, 2017 issued in GB Application No. GB1700868.1 (1 page).
Office Action dated Sep. 21, 2020 issued in U.S. Appl. No. 16/526,257 (18 pages).
Exam Report dated Sep. 28, 2020 issued in European Application No. 17 811 582.0 (6 pages).
Summons to attend oral proceedings pursuant to Rule 115(1) EPC dated Mar. 3, 2022 issued in European Application No. 18 830 879.5 (9 pages).
Office Action dated Jan. 4, 2023 issued for Chinese Application No. 201880087999.4 (8 pages).

* cited by examiner

MONITORING OF DISTRIBUTED SYSTEMS

This application is the U.S. national phase of International Application No. PCT/EP2018/097100 filed Dec. 28, 2018 which designated the U.S. and claims priority to EP Patent Application No. 18154987.4 filed Feb. 2, 2018, the entire contents of each of which are hereby incorporated by reference.

BACKGROUND AND SUMMARY

This invention relates to monitoring of distributed systems and in particular to the management of sensors and actuators operating in the "Internet of Things". Good quality, reliable data is fundamental to the Internet of Things.

The Internet of Things (IoT) enables objects to sense their environment, communicate with each other to produce new information, and act on that information. The principles are already finding application in fields such as transport, "Smart Cities", retail, logistics, home automation and industrial control.

For example, in retail applications, the aim is to integrate all available shopping channels—in-store, online store, mobile apps, mail-order—to offer a seamless shopping experience for customers. In particular digital signage systems are being developed, such as display screens connected to a network that is constantly mining, analysing and responding to a broad spectrum of real and near-real time data to dynamically tune and change the screens' content.

In the field of mobility, applications are being developed for connected vehicles, asset/fleet management and freight monitoring.

There is also a growing market of "smart cities" in which data from numerous independent sources are merged, and used to improve the functioning of city services. This general approach is also applicable to any collaborative environment where multiple infrastructure owners collaborate to achieve a concerted goal. Although the embodiments to be described later in this specification are directed to "smart cities" environments, this is not intended to be limiting as the principles are of wider application.

Policy-based management has proven to be an effective approach in the management of large-scale distributed systems. In this approach, devices issue messages that indicate their state and any deviations from expected behaviour, and these messages are transmitted to policy decision points (PDP) where the messages are used to activate policies. These systems use the event—condition—action model of policies, in which the device message is the event that triggers the policy, the condition section allows for the evaluation of tests that establish the system context in a greater level of detail, and finally the results of the conditional tests establish an appropriate action that is sent to a policy execution point (PEP) associated with any device that needs to be changed as a result of the policy action. The ability to add, remove and modify policies gives these systems great flexibility and extensibility, as new managed devices can be added to the management domain at any time. Policy-based management is commonly adopted for the management system of large complex dynamic systems. However, there is an important distinction between systems generally in use today and the proposed use of such systems in the context of "smart cities".

Policy-based management systems in use today typically have a single management domain where all of the managed entities are owned and controlled by the policy authors. This means that the placement and performance of sensors and actuators in the managed system is well-known and well-characterised and that the management system has a well-defined set of common goals. This means that, in practice, the results of conditional statements in the policy definitions are assumed to be both reliable and truthful, and can be used to unequivocally establish a local management context for successful choice of an appropriate action or set of actions. The conditional statements may be considered as part of a risk-management strategy: a single observed event may potentially cause a number of changes to the managed system, some of which might be significant in impact. The collection of further, confirmatory, data allows the choice of action to be narrowed and the risk of incorrect actions reduced. Systems of this type also assume that the policy authors have a high level of domain-specific knowledge that allows the creation of effective and accurate policies.

In the evolving "smart cities" systems, sensor infrastructure may be built in an ad hoc way over a period of time and by different organisations, with different requirements and different end goals. Authors of policies are likely to find that, in order to establish the required management context for any policy-based actions, they require data inputs from sensors that they neither own nor control. Consequently, the policy authors need an indication of the reliability of the sensors, and the data they produce, in order to make appropriate decisions and manage the risk to their own system.

The issue of trust has been the subject of much research over many years. One major problem is that "trust" is hard to define, and any categorisation will be related to the use case and person involved. The sharing of trust levels between people and organisations is difficult, and open to potential abuse when the parties have different goals. Other more technical approaches seek to use authorisation keys to establish the identity and authorisation of components of the system but this does not address the metadata associated with the encrypted data. Approaches such as this also require the establishment of an identity and authorisation key infrastructure before the system is of any practical use. There are schemes that use recommendations from independent third parties (that is, parties other than the provider of the data) as indicators of the trust and reliability of data sources, but these depend on the willingness of external parties to contribute to crowdsourcing such data, and on the reliability of the contributors who may, either for legitimate or malicious reasons, provide ratings which are incompatible with the requirements of at least some of the users who wish to use the data. For the data consumer faced with such recommendations they must question if the rankings are in fact genuine, and how the ratings of other parties with unknown use cases relate to their own use case. To do this successfully also imposes a high initial infrastructure requirement for identity checking, and for the rating system.

In future smart environments with ubiquitous sensors, the sensors will be small and of minimal computing power, with low cost and low capability. The data they produce will be collected over wireless or fixed links, and aggregated and potentially processed before being available for use by any management system. This makes the environment easy to subvert with rogue data, for which checking and verification will be difficult.

Current policy-based management approaches commonly address management domains with a single management hierarchy, even if policy creation is delegated to a number of authors within that hierarchy. This means that a common set of management objectives governs the creation of policies, the goals of the policies, and the placement of sensors that collect data to enable the policy based management. Furthermore the operating characteristics of the sensors and managed devices in the domain are well understood. For single-management domain systems a lot of expertise is expected from the policy creators, and they are assumed to be domain experts. This uniformity of purpose means that the data from the sensors is assumed to be trustworthy, unless the sensor has completely failed.

This approach assumes a standard policy-based management approach to the management of large scale systems and systems of systems as might be the case in a growing "smart" environment where "islands of smartness" grow over time into a much larger system. Each component system of the collection can be regarded as a "black box", and at any moment in time the system owner will have a view on the desired state for the system. The performance of the system is monitored, and when the performance falls outside predetermined operating conditions a message or trigger event is created and sent to the management system to trigger a management policy. The goal of the policy is to restore the operation of the system to the desired state by some control action.

In multi-owner systems such as might be encountered in a "smart city", sensors and actuators are installed to meet the operational goals of their individual owners. Hardware is selected and installed, and policies written, to reflect the individual goals of the owners or operators of the system as a whole. When these discrete systems are federated, and data is used to drive policies for parties other than those responsible for the sensors generating the data, the exact operating characteristics of devices may not be known by the policy authors. Indeed the possibility exists for erroneous data to be injected deliberately, in an attempt to alter the behaviour of the system. This means that the implicit trust in the quality of the incoming data used to drive the policy-based system no longer exists, so policy authors need to mitigate the risk of data errors. Current policy data management systems have no explicit feedback mechanisms to identify these errors, or to identify successful policy solutions.

According to a first aspect of the invention there is provided a network of sensors and actuators for monitoring and controlling an environment in accordance with predetermined policies, the network having a policy decision point for responding to trigger inputs received from the sensors, a data store for maintaining policies for retrieval by the policy decision point, and a policy execution point for controlling actuators in response to commands received from the policy decision point, further comprising a reliability monitoring element which identifies effectiveness of individual policies by identifying an intended outcome from a policy, measuring an input from a sensor following implementation of a policy, and comparing the input from the sensor with the intended outcome, in which each policy includes a check function, using a sensor input to monitor if actions generated by the policy are successful in moving the system towards a system state specified by the policy, and in which actions generated by the policy are initiated in response to inputs from one or more first sensors, and the check function is initiated in response to data received from at least one further sensor independent of the one or more first sensors.

In a second aspect, the invention provides a method of monitoring and controlling an environment using a network of sensors and actuators operating in accordance with predetermined policies, wherein effectiveness of individual policies is monitored by comparing inputs from the sensors with intended outcomes from policies controlled by previous inputs from one or more of the same sensors, in which each policy includes a check function, wherein a sensor monitors actions generated by the policy and generates an output indicative of whether a system state is approaching a condition specified by the policy, and actions generated by the policy are initiated in response to inputs from one or more first sensors, and the check function is initiated in response to data from at least one further sensor independent of the one or more first sensors.

This invention allows the effectiveness of a policy to be monitored. Rogue sensors and/or actuators, or poorly written policies using non-optimal or inappropriate combinations of sensors and actuators can be identified by identifying outcomes which are inconsistent with the intended purpose of the policy, and can be used to determine whether an alternative or modified policy (for example using different actuators and/or gauges) should be implemented.

To take a simple example, if a policy causes an air conditioning unit to be switched on in response to a temperature gauge reporting temperature rising above a given threshold, but the temperature as reported by the gauge (or by other gauges monitoring but not controlling the environment) continues to rise, this indicates an unreliable policy. By comparing results from a number of policies the user may be able to identify whether the actuator—the air conditioning unit—is faulty (so the temperature has not changed as desired), or one of the sensors is faulty (policy was incorrectly triggered, or has been effective but the confirming sensor has failed to register the change) or whether there is some external factor preventing the desired outcome (e.g a window left open)

Embodiments of the invention make check measurements of the state of the system after the policy has been enacted, to assess if the policy has successfully moved the system operation to the desired state. The degree of success in achieving this change is used to produce a quality ranking of the policy based on the effectiveness of its action in achieving the desired changes.

The deterministic ranking of both policies and triggering data provided by embodiments of the invention aids risk-management for individual owners, and allows for ongoing optimisation of the policies used to manage the system.

Embodiments of the invention allow a user to start from a position of zero trust in any external party and uses only the policy writer's own specific usage to grade the quality and reliability both of the data and of the policies used. Policies and data are rated objectively against their impact on outcomes specified by the policy author, and because it exists in a single management domain the ranking can use an internal scale that is not required to agree with external parties.

Embodiments of the invention extend the event-condition-action model to include feedback mechanisms that assess the impact of the policy against the specified required outcomes of the policy writer. This zero-trust approach does not rely on any system components being pre-installed: individual system managers are able to choose if and when to implement their own quality ranking system.

If the action clause of a policy is extended to assess its effectiveness, the effectiveness result can be used to provide a quality indicator for the data/policy pair. Any action clause has the potential to be defined as a sequence of actions, and the embodiment implements an additional action, with a time delay if required to allow for the system to stabilise.

At its most simple, the system check could just re-measure the sensor that produced the trigger data after some suitable time delay and determine if the reading has moved in the direction required by the policy. The test compares pre- and post-action measurements against the policies goal and produces a positive, negative or null rating which can then be communicated to the policy management system. This offers the potential to identify faulty sensors: for example if the reading does not change the management system may automatically schedule a device check. However, it will not necessarily detect if a sensor is poorly calibrated and just returns offset data. There is also the possibility that the failure to record a change in temperature is, in fact, a correct response: for example because the actuator (the heating system) has failed to respond to the trigger.

Alternatively a range of measurement policies could be selectively triggered at the end of the action. Such measurement policies could be reused as long as the appropriate data/policy pair is identified. As a simple example of this approach, in a large open-plan office with a number of temperature sensors, a building management system can be implemented using policies to control the comfort of the staff. The policy would be triggered by a reading from one sensor, and another sensor in the space can be used for the condition checking. A more elaborate system may also check if external doors or windows are open, and take measurements of the external temperature. The action would be to change the boiler temperature in response to the initial sensor, and after a delay (for example ten minutes) the temperature in another part of the space may be checked. If the trigger event was a temperature below a threshold value, and the action implemented by the trigger is to increase boiler temperature, one would expect to see the second temperature measurement, after the delay, to be higher than its value at the trigger time. (Note that the two sensors may not be recording the same temperature at any given time, but both should have increased). This would indicate a successful data/policy pairing, as the goal of the policy is met. There are a number of different checking strategies that could be used.

The system could use a different sensor of a similar output type to conduct the same data comparisons and produce the same positive, negative or null rating. This requires that the second sensor is located where it can be affected by the application of the policy. This adjacency would initially be identified by the policy author when the policy is written. The potential also exists for the policy creation tool to suggest suitable verification sensors based on location and sensor type.

At its most complex the test condition could query multiple sensors and, after statistical manipulation such as consensus or averaging (mean, mode or median evaluation), the resultant value can be compared with the trigger data and again used to produce a positive, negative or null rating.

In a preferred embodiment, a semantic context broker is implemented. The semantic context broker takes into account performance rankings from multiple-use cases of the same data/sensor. This can come into play when sufficient single management domain implementations exist to make sharing of data worthwhile. Provision of the semantic context broker would allow the use of external party sensor assessments as a baseline for establishing reliable data policy pairs.

Having obtained evidence of a data/policy use, the rating can be processed and stored. After every policy execution, a message may be sent to a policy store manager, which identifies the data trigger, the policy and the outcome rating and updates a quality value for that data/policy pair, which may move its position in a quality ranking of all data/policy pairs. Subject to a user-defined threshold, poorly-performing policies can be checked or modified. Poorly-performing data policy pairs can automatically have function checks applied by the policy store manager. Such checks would themselves be part of the policy based management system with performance checks triggered by low quality rankings Such function checks could cover automated performance and calibration tests. Ultimately the lowest-scoring policies would be referred to human operators for investigation Having obtained a performance ranking of data policy pairs an additional quality check may be performed as part of the condition checks in the ECA (event condition action) policy specification, so that for example a low ranking policy might be discarded and not executed, as an approach to risk reduction. This would mean that the overall management system could automatically decide not to action policies that have a poor quality rating, and the failures to execute would then be logged for later review.

For large dynamic systems it would be difficult to write policies to capture all potential states of the system, as it is too large to model easily, so problems are likely to only become visible in the live system. The dynamic nature of the systems, where policies, sensors and actuators can change over very short time scales, further complicates any off-line checking prior to real-time execution in the system. The quality ranking of data/policy pairs allows identification of those areas of the system that need improvements either in the availability of sensor data or in the policies themselves. By directly assessing the result of a policy against its goal, the policy writer can assign a score to the effectiveness of the combination of that policy and its triggering data. Over time these scores will combine and allow all the policies to be ordered in terms of effectiveness.

Low effectiveness could be indicative of a number of situations. For example, the policy itself may be poorly written, and the trigger and action may not be as well related as the author assumed. Alternatively, the data that triggered the policy might be unreliable or inaccurate, so a low level of trust can be given to that data. It is also possible that the sensor or sensors used to evaluate the effectiveness might be poorly placed to genuinely assess the policies operation.

Given an ordering of the user policy set, a number of management activities become possible. Poorly performing data/policy pairs can be rewritten with a view to improving effectiveness. At run time, policy/data pairs that consistently fail to produce a good output can be blocked from execution. If the score is considered as indicative solely of data quality the quality of data supplied from independent parties can be used in conditional statements as a further potential risk reduction technique.

Errors in sensor quality or placement can then be addressed by installing extra sensors in appropriate locations—driven by this feedback, the economic case for extra sensor deployment becomes more apparent and straightforward. Low-ranking data policy pairs could trigger automated performance checks of sensor performance, prior to any human assessment. It would also be possible to automatically suggest alternative candidate sensors that might improve performance.

The quality rating relates to both the triggering event and the contents of the policy, by generating conditional data checks and action sets. The embodiment provides a rating for each policy.

By way of illustration, in a basic policy which executes an action without any conditional checking, the quality rating is influenced by only two factors, namely the input trigger event and the output actions. If the quality of the system response is poor, it is either the result of an imprecise or erroneous measurement of the desired system state, or it is the result of inappropriate control actions modifying the wrong system components. This relatively simple binary situation makes policy modification easier, particularly if policies are authored by local domain experts with significant levels of operational knowledge of the system under their control. The policy is modified either by disregarding any input identified as spurious or, if there are no such spurious inputs, by modifying the control actions. However, in a slightly more complex policy, including some conditional data checks to control policy execution, the measurement component consists not only of the trigger event itself but also any conditional measurement results that may influence the action component that is to modify the system. More complex policies may include logic based on the conditional data checks, and include the standard computational constructs such as if-then-else or switch-case constructions when the actions to be triggered by an event are selected by conditional statements. Identifying the cause of inefficiencies in such policies would be complicated and for that reason it is desirable to decompose the complex policies into a set of simpler linear policies. This would assist in identifying the sources of non-optimal performance and in rewriting the policy.

In order to use the objective ranking system of the invention, check actions may be added to the end of each policy (action set) to assess the result of its application. The action set may require delayed actions to be included in the workflow of the policy structure, in order to allow such check actions to assess the effect of the prescribed action.

BRIEF DESCRIPTION OF THE DRAWINGS

The invention therefore provides a method for the continuous monitoring and improvement of an automated policy-based management system.

By way of example, an embodiment of the invention will now be described with reference to the drawings, in which.

DETAILED DESCRIPTION OF PRESENT EXAMPLE EMBODIMENTS

Figure 1:
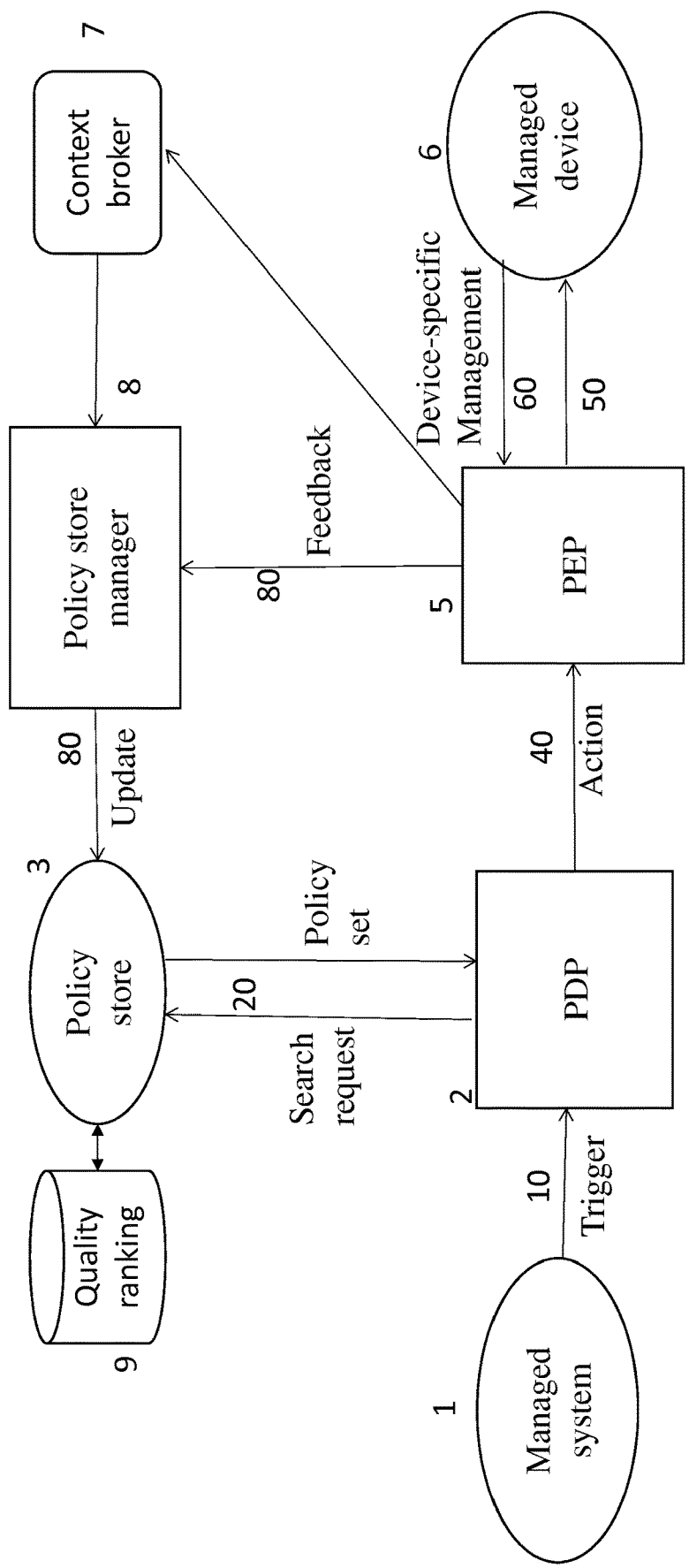
FIG. 1 is a schematic representation of the functional elements of a simplified installation which co-operate to perform the invention, depicting the interactions between them.

FIG. 1 depicts the functional elements which co-operate to perform this embodiment of the invention and the interactions between them when implementing this process. Policies are initially stored in a policy store 3. Additional management functions are associated with the policy store 3 to allow the system to receive and update rankings for the policies, which are maintained as an additional field in the data stored for each policy in the store 9. It may use these rankings to prioritise the policies and to provide lists of underperforming policies to the management domain owner or identified person responsible for policy creation and management. This could take the form of an additional policy store management component.

In a conventional architecture, trigger events 10 are received from sensors 1 by a policy decision point (PDP) 2 for that management domain, and the event is used by the PDP to retrieve from the associated policy store 3 a list of any policies associated with that trigger event 10 (step 20). Each of these policies has one or more actions defined in them that target actuators in the managed system. The PDP then checks and evaluates any conditional terms in the policies and prepares a set of actions that need to be enacted, based on the initial policy set and any modifications to that set required by the conditional terms.

The PDP 2 which generates instructions 40 according to the modified policy set, which are to be transmitted to a policy execution point (PEP) 5. The PEP sends control signals 50 to control one or more managed devices (actuators) 6. Once the actuators have carried out their assigned actions, the evaluation process is scheduled.

The feedback may be generated by interrogating other sensors, as well as the actuators 6 which can report their current state (60) to the policy execution point. The PEP uses the feedback data to generate feedback 70 which is reported to the policy store manager 8. The policy store manager uses the feedback to generate updates (80) modifying the policies in the policy store.

For implementation of this illustrative embodiment, data from sensors having different owners is discoverable using a search or catalogue function and the data is available for use by parties other than the sensors' respective owners, either as policy triggering events or conditional checks. Obtaining access to commercial or private data is possible but introduces a second level of reliability checking for sources, and commercial terms if the negotiated access is paid for.

Figure 2:
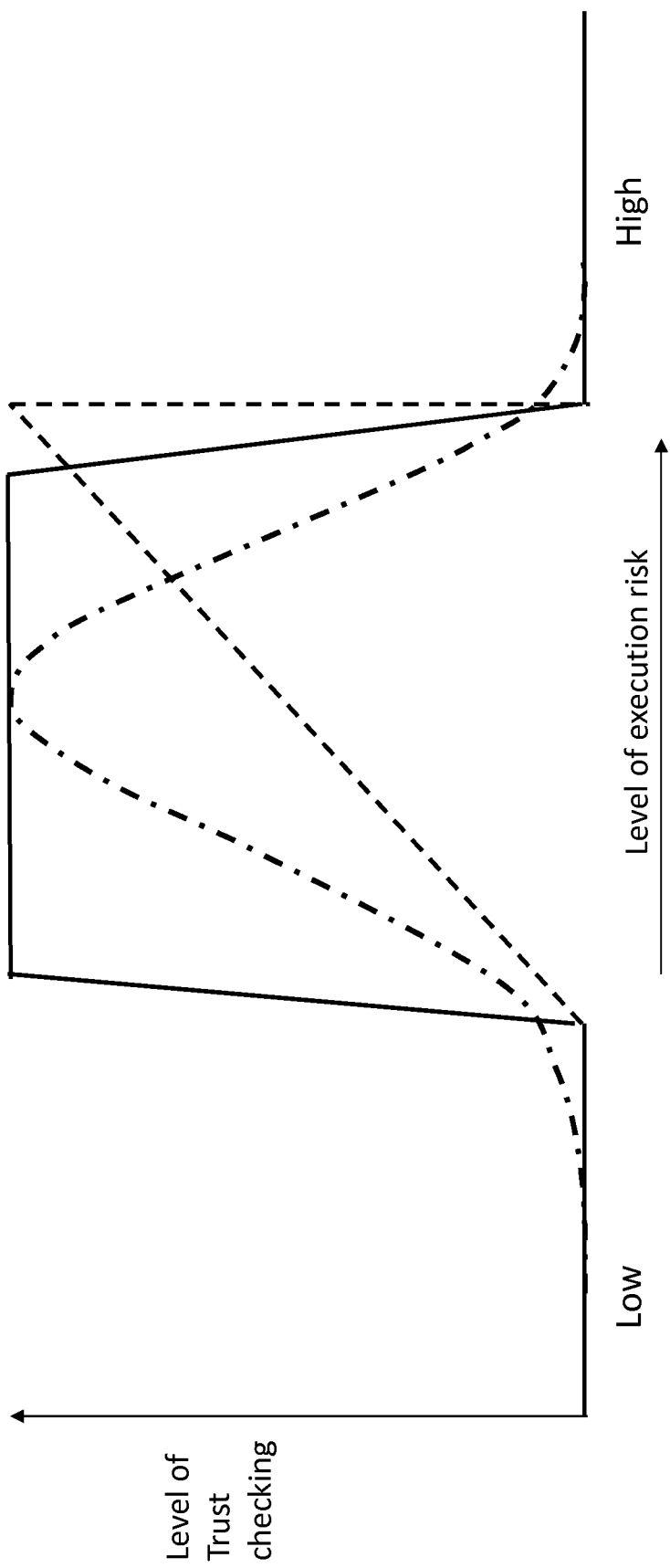
FIG. 2 is a graphical representation of a cumulative trust-checking scoring system

Goal identification is still a human-centred process. Such policies will be of the Event/Condition/Action type as outlined in IETF RFC3198. The present embodiment establishes specified criteria for condition checking. Some policy-driven tasks can use simple trusted sensors, and actions would be either easy to reverse, or non-critical. Such policies would not require any additional checking prior to execution. At the other extreme there are trusted sensors such as fire alarms where the risk associated with any delay in response is potentially serious and so execution of the policy actions needs to occur immediately, and in such cases no checking is made before executing the policy, any erroneous execution being resolved after the event. Between these two extremes, it becomes necessary to check the quality of decisions and the level of trust in data from independent parties. This is represented in FIG. 2. The level of trust checking can be domain-specific, but might be conveniently represented by a bell curve (chain dashed line in FIG. 2), although other patterns of interaction can be used, such as a step change (solid line), or a sawtooth (dashed line), as indicated in FIG. 2.

It will be apparent that the need for conditional checking in a policy closely mirrors the risk associated with its associated action. The level of acceptable risk would be an input provided by the human policy creator, based on their specific domain knowledge.

The policy author uses a data catalogue to identify the triggering event for the policy and the proposed management action to be taken if the policy is triggered. Depending on the attitude to risk management, data checks can be chosen as part of the conditional statement to confirm the measurement context of the trigger event. According to an embodiment of the invention, a check function is added to the policy, to determine if the policy action has been successful in moving the system towards the policy's goal. This clause may activate immediately, or a delay may be introduced to allow the system to stabilise. In this embodiment, the measurement policy that forms the basis of the objective ranking mechanism is one such action and can be sent to the PEP associated with the part of the system to be tested (40), where it takes a measurement (40, 50), which is returned to the PEP 5 (step 60) and forwarded to the PDP to calculates a rating for that execution of the policy, and sends the result 70 to a policy store manager 8 which calculates the cumulative score.

Figure 3:
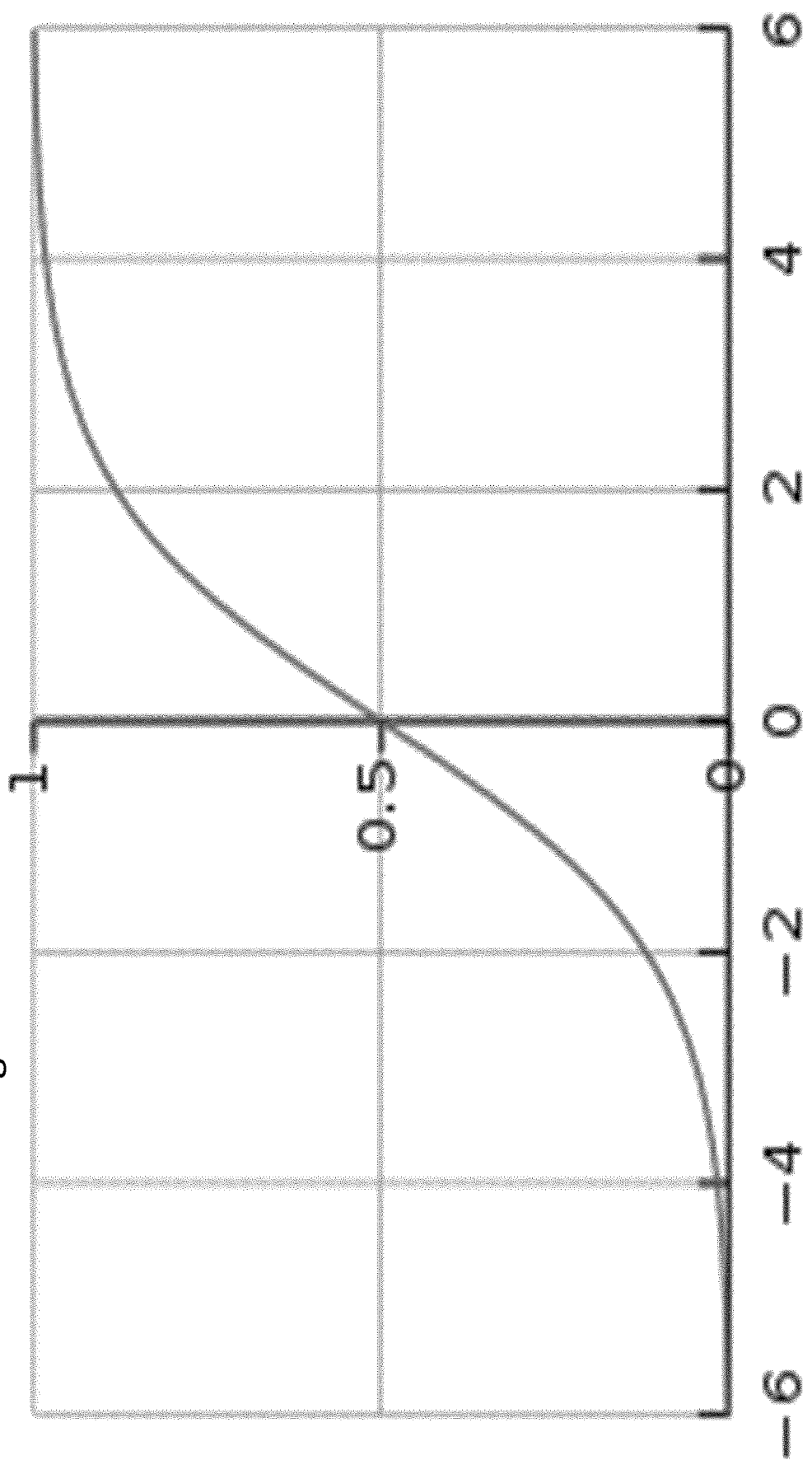
FIG. 3 is a representation of a sigmoid curve

The policy data rating may be derived as the number of positive ratings compared with the number of total ratings or executions, giving a linear quality range. As an example every pair could be initially allocated a neutral ranking and the score adjusted as the proportion of positive ratings changes. Rather than varying linearly, the scoring may generate an asymptotic increase with every advantageous use, eventually approaching a maximum value, as shown in in FIG. 3, and likewise if the scoring deteriorates. The output of the checking clause will be positive, negative or neutral depending on whether the goal has been achieved, nothing has changed, or the situation has worsened. This output is sent to the policy author's policy store where it is used to change the quality value associated with that trigger/policy pairing. As already discussed, the quality value of any policy/data pair may be simply the ratio of positive feedback scores to the total number of policy invocations. These values are stored in the policy store with the associated data/policy pairs and may be used to calculate other forms of score if desired. Embodiments of the invention provide that the quality rating of a particular trigger/policy pair should lie on a sigmoid curve with for example a value of 1 representing high performance and a value of −1 poor performance. An example of such a sigmoid curve is shown in FIG. 3

This emphasises small changes within the normal range area of operation. The policy author is able to inspect the data store 3 and identify poorly-performing data/policy pairs and make improvements to the system by changing either the data or the policy, or by introducing more sensors to more accurately track the system behaviour.

The position of each pairing's rating on the sigmoid curve is an indication of its effectiveness and, indirectly, an indication of the quality of the data used to trigger the policy. The x-axis of the sigmoid curve represents the total positive score and the quality value (y-axis) is calculated using the formula for the curve. Using such a score curve allows policy/data pairs to rapidly move out of the centre of the curve and makes separation of effective data/policy pairs from problem pairs more obvious. The results 80 of the quality evaluation are passed to the policy store 3 where it is used to update the overall score of the trigger/policy pair and the number of invocations is also recorded.

The details of the slope of the curve will depend on the operating environment and can be customised by the policy store owner. Once the quality score is established there are two possible complementary processes that can occur. An evaluation of the policy store can be triggered by human intervention or after a predetermined period, to order all policies by effectiveness ranking and allow the policy owner to evaluate, modify or potentially remove poorly performing policies. However, in a preferred embodiment a more dynamic interaction can be employed, that checks policies at run time A complete lifecycle of a policy will now be described, by way of example. In this embodiment, the manager of part of the collaborative system has identified a resource for which it is required to write an automated management policy, in order to address a system performance goal.

Figure 4:
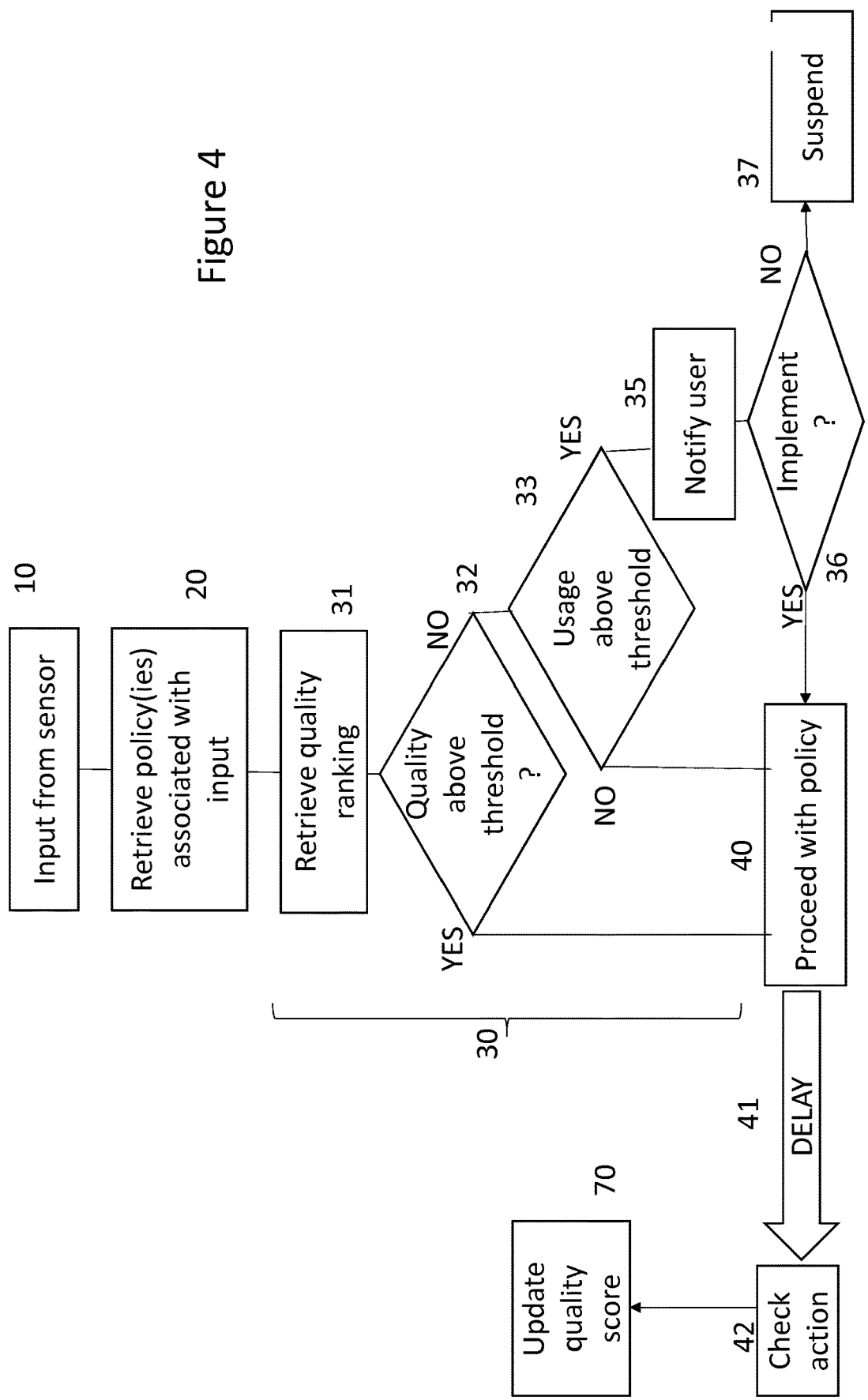
FIG. 4 is a schematic flow chart illustrating a process operating according to one embodiment of the invention.

Referring to FIG. 1 and to FIG. 4, the task or goal to be automated in this example is a system to maintain the temperature of an open-plan office.

Referring to FIG. 4, the policy author decides on the goal of his policy (step 500). In this example, the room temperature should be maintained at 20 degrees Celsius when the room is occupied.

The policy author browses a device catalogue to identify and select a sensor suitable for use as a policy trigger (step 501).

The policy author also selects a second sensor (step 502) suitable for use as a confirmation sensor to be used to monitor the performance of the policy. This sensor will be used as a passive sensor, reporting whether the actuation performed in response to the first sensor is in fact achieving its desired outcome.

Once the policy has been prepared, it is loaded into the policy store 3 as an active policy (step 503). A typical policy process is depicted in the chain-dotted line in FIG. 4.

"IF sensor A reading is less than 20 degrees AND occupants are present:
increase heat input,
wait 20 mins
check sensor B,
send sensor A and sensor B readings to policy store manager."

The trigger event step 550 (temperature falls below 20 C), causes retrieval of the conditional data ("is the space occupied?") step 551. Occupancy may be determined by other sensors, such as movement detectors, or access control systems, or may be implied by factors such as time of day. If the condition is met, (step 552) the PEP 5 is instructed to carry out the required action (step 553), in this case by increasing the heating input, and after a predetermined time (step 554) temperature readings are taken from the second sensor (step 555) and the results reported to the policy store manager 8 (step 556).

A practical embodiment may have more than one conditional input, and the feedback control may also be more complex. For example, the second sensor may return a temperature reading before the heating step as well as afterwards, so that a change can be reported rather than just an instantaneous value.

Once the policy is loaded in the policy store 3, if at any future time the first sensor A falls below its trigger setting of 20 degrees and causes a low temperature event to be reported to the PDP 2 (step 10), the PDP queries the policy store 3 (step 20) and retrieves any policies triggered by such a low temperature event.

Figure 5:
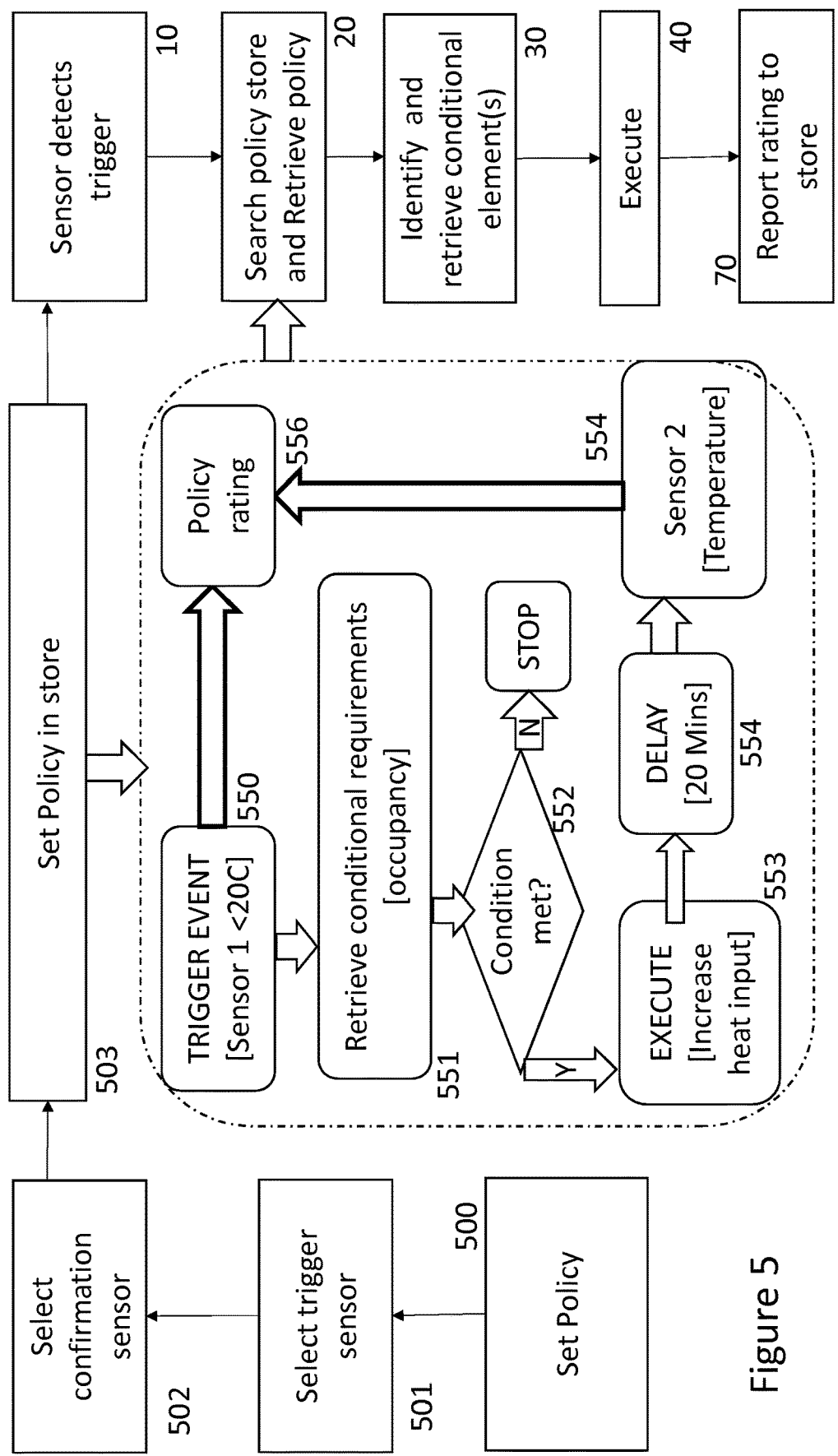
FIG. 5 is a schematic flow chart illustrating the quality-rating steps of a process operating according to an embodiment of the invention.

At this stage the quality ranking of the policy is assessed (step 30) and a decision is made as to whether to proceed automatically (step 40) or to await confirmation by a user (35, FIG. 5). The quality ranking takes into account the historical reliability of the data, and the threshold is selected according to factors including the potential consequences of a "wrong side" failure—that is to say balancing the consequences of proceeding in response to a false alarm, against the consequences of failing to proceed when the alarm was in fact genuine.

The quality assessment will be described further with reference to FIG. 5. FIG. 5 illustrates an assessment process operating according to an embodiment of the invention.

A trigger event 10 is received by the PDP 2 and the corresponding policy is retrieved from the local policy store 3 (step 20). The policy store at this point retrieves the quality ranking and number of invocations (step 31) and can test these before executing the policy.

If the quality level is higher than a threshold value (step 32), the actions specified in the policy are carried out (step 40). If the quality level is lower than the threshold and the usage is also below a threshold value (step 33) the actions specified in the policy are also carried out 40. This allows the system to operate during a setup phase.

If the quality level is less than the threshold value and the usage count exceeds the threshold, the system manager is notified of a potential problem (step 35). This may be flagged up to a user immediately or added to an attention list for later evaluation by the policy owner for effectiveness. The policy manager 8 determines (decision point 36), for each policy, whether the actions specified in the policy are to be carried out (40) in this circumstance or suspended (37). The choice will depend on an assessment of the potential consequences of proceeding with an action is or suspending it, in the absence of reliable information.

This embodiment provides each management domain with a rank-ordered list of data/policy pairs that relates to the degree of trust the policy author places in the triggering and conditional data evaluations. This ordering is objectively based on the performance of the policies in operation and the operating context. Given suitable agreements these rankings of essentially data quality could be shared with other policy authors in a form of federated trust network.

The policies for each administrative domain are stored in the policy store 3. The data in the store includes both the quality ranking 9 and number of invocations for each policy.

The assessment of the policies' effectiveness is performed by the policy decision point (PDP) 2. After using the trigger event 10 to identify a set of policies from the policy store, the PDP can continue to evaluate the quality score before generating the set of policy actions required from the actionable policies.

Referring again to FIG. 4, the PDP 2 downloads the policy (step 20) and identifies any additional data required to implement the policy, specifically any conditional elements (step 25). It then implements the steps 551-556 specified by that policy (step 40). This includes the checking of conditional data (step 551) requiring, in this case, that it checks the occupancy of the office.

If the occupancy check is positive, the PDP 2 sends messages to the PEP 5 controlling the heater to increase heat input (step 553) and a second message to the PEP controlling sensor B telling it to wait 20 mins (step 554) and then send measurement details (step 555) to the policy store, and the trigger value from sensor A, to the policy store manager 8 (step 556)

On receipt of the message the policy store manager 8 computes the rating for the policy execution (step 80). It uses this to update the policy's quality score and increments its associated execution counter. In this example, the rating would be based on the degree to which the policy has been successful in achieving the required temperature based on the values of A and B.

Following execution of the required actions 40, a check 42 is made of the system state. This can be specified as one of the actions in the action set (retrieved at step 20). In order to assess whether the actions specified by the policy are resulting in the desired outcome, the action set 40 may need to specify a delay 41 before the check 42 is made. The action set 30 may in fact be more considered as a workflow, with actions arranged to occur in a specified temporal sequence. The measurements made in the checking phase 42 are used to update the quality ranking 9 in respect of the policy which implemented the actions in question. At the most basic level the quality assessment could just measure the data input that caused the trigger and determine if it has moved closer to the desired state. The quality check could assess other system components affected by the change to determine if they are in a more desired state (step 60) and produce a composite evaluation of the effect. We can propose the situation where the system has a number of standardised condition checks that range from single point measurements through averages over a number of values to more complex consensus algorithms, each of these templates could then just be parameterised for the specific policy.

A semantic network or ontology of a given domain may be used to combine performance rankings from multiple use cases of the same data/sensor. Where data is being put to similar uses by multiple users, each user can take into account rankings regarding the data/sensor generated by others. The degree to which a given user's rankings are taken into account in this way is weighted by a context broker 7 according to the semantic distance between the uses of the data. As a simple example, air conditioning and heating both involve temperature control: therefore if a particular data/sensor has performed well in one context, it is likely to perform well in the other. In cases where the same data is being used for very different purposes, however, the relevance of performing well in one case to the other is much reduced.

There may be several policies triggerable by a given event, each of which may, or may not, be carried out on any particular occasion depending on whether the individual conditions particular to each policy apply.

A simple example for a public space with dynamic heating and lighting controlled by such a system could have policies arranged for it such as:

IF temp <16 C AND space unoccupied: heat to 16 C, wait 20 mins and report measured temp If temp <16 C AND space occupied: heat to 20 C, wait 20 mins and report measured temp The use of two simple policies avoids the use of a more complex policy that would use the state of occupancy to switch between two different outcomes. Making two simple policies is much easier to manage without additional logging, or a complex audit trail for each enacted policy, which would require all the input data used to make the decision, and the result of the decision process within the policy structure.

The invention claimed is:

1. A network of sensors and actuators for monitoring and controlling an environment in accordance with predetermined policies, the network having a policy decision point for responding to trigger inputs received from the sensors, a data store for maintaining policies for retrieval by the policy decision point, and a policy execution point for controlling actuators in response to commands received from the policy decision point, further comprising a reliability monitoring element which identifies effectiveness of individual policies by identifying an intended outcome from a policy, measuring an input from a sensor following implementation of a policy, and comparing the input from the sensor with the intended outcome, in which each policy includes a check action for assessing the result of that policy's application, using a sensor input to monitor if actions generated by the policy are successful in moving the system towards a system state specified by the policy, in which actions generated by the policy are initiated in response to inputs from one or more first sensors, and the check action is initiated in response to data received from at least one further sensor independent of the one or more first sensors, and in which the check action is initiated after a predetermined period after the actions initiated by the policy, to allow the system to stabilize.

2. A network according to claim 1, wherein the data received from the at least one further sensor indicates whether actuation performed by the actuators in response to the inputs from the one or more first sensors has achieved the intended outcome of the policy.

3. A network of sensors and actuators for monitoring and controlling an environment in accordance with predetermined policies, the network having a policy decision point for responding to trigger inputs received from the sensors, a data store for maintaining policies for retrieval by the policy decision point, and a policy execution point for controlling actuators in response to commands received from the policy decision point, further comprising a reliability monitoring element which identifies effectiveness of individual policies by identifying an intended outcome from a policy, measuring an input from a sensor following implementation of a policy, and comparing the input from the sensor with the intended outcome, in which each policy includes a check action for assessing the result of that policy's application, using a sensor input to monitor if actions generated by the policy are successful in moving the system towards a system state specified by the policy, in which actions generated by the policy are initiated in response to inputs from one or more first sensors, and the check action is initiated in response to data received from at least one further sensor independent of the one or more first sensors, and in which a quality ranking of the policy is generated based on the effectiveness of its action in moving the system towards a system state specified by the policy.

4. A network according to claim 3, in which implementation of a policy is controlled in accordance with its quality ranking.

5. A network according to claim 4, in which policies with a low quality ranking are alerted to a user interface when triggered.

6. A network according to claim 4, provided with a semantic context broker function which monitors performance rankings from a plurality of policies triggered by a common sensor to generate a reliability value for the sensor.

7. A method of monitoring and controlling an environment using a network of sensors and actuators operating in accordance with predetermined policies, wherein effectiveness of individual policies is monitored by comparing inputs from the sensors with intended outcomes from policies controlled by previous inputs from one or more of the same sensors, in which each policy includes a check action for assessing the result of that policy's application, wherein a sensor monitors actions generated by the policy and generates an output indicative of whether a system state is approaching a condition specified by the policy, and actions generated by the policy are initiated in response to inputs from one or more first sensors, and the check action is initiated in response to data from at least one further sensor independent of the one or more first sensors, and in which the check action is initiated after a predetermined stabilization period after the actions are initiated by the policy.

8. A method according to claim 7, wherein the data from the at least one further sensor indicates whether operation performed by the actuators in response to the inputs from the one or more first sensors has achieved the intended outcome of the policy.

9. A method of monitoring and controlling an environment using a network of sensors and actuators operating in accordance with predetermined policies, wherein effectiveness of individual policies is monitored by comparing inputs from the sensors with intended outcomes from policies controlled by previous inputs from one or more of the same sensors, in which each policy includes a check action for assessing the result of that policy's application, wherein a sensor monitors actions generated by the policy and generates an output indicative of whether a system state is approaching a condition specified by the policy, and actions generated by the policy are initiated in response to inputs from one or more first sensors, and the check action is initiated in response to data from at least one further sensor independent of the one or more first sensors, and in which a quality ranking of the policy is generated based on the effectiveness of its action in moving the system towards a system state specified by the policy.

10. A method according to claim 9, in which implementation of a policy is controlled in accordance with its quality ranking.

11. A method according to claim 10, in which policies with a low quality ranking are alerted to a user interface when triggered.

12. A method according to claim 10, provided with a semantic context broker function which monitors performance rankings from a plurality of policies triggered by a common sensor to generate a reliability value for the sensor.

* * * * *